May 28, 1935.　　　　S. SORENSEN　　　　2,002,647

VALVE

Filed June 26, 1933

Sam Sorensen  INVENTOR.

BY　Jesse P. Stone
　　Lester B. Clark

ATTORNEYS

Patented May 28, 1935

2,002,647

UNITED STATES PATENT OFFICE 2,002,647

VALVE

Sam Sorensen, Houston, Tex.

Application June 26, 1933, Serial No. 677,577

10 Claims. (Cl. 251—68)

My invention relates to valves and more particularly to the type of valve ordinarily called a gate valve to close off the passage of fluid through the line in which the valve is placed.

It is an object of the invention to provide a valve wherein the valve member may be tightened into its seat in either open or closed position.

It is another object of the invention to provide a valve of this sort in which the escape of fluid or foreign material into the valve housing is prevented.

I desire to provide a full open passage through the valve housing when the valve is in open position but to prevent any lateral escape of material into the housing during the period when the valve is open.

It is another and important object to provide a valve which will release easily from its seat in either open or closed position when the valve is to be moved.

Another object of the invention is to provide in a valve structure of this character a valve which may be easily moved at all times in operating the same from an open or closed position in the valve housing.

In the drawing herewith, Fig. 1 is a side view partly in longitudinal section illustrating a preferred embodiment of the invention.

Figure 1:
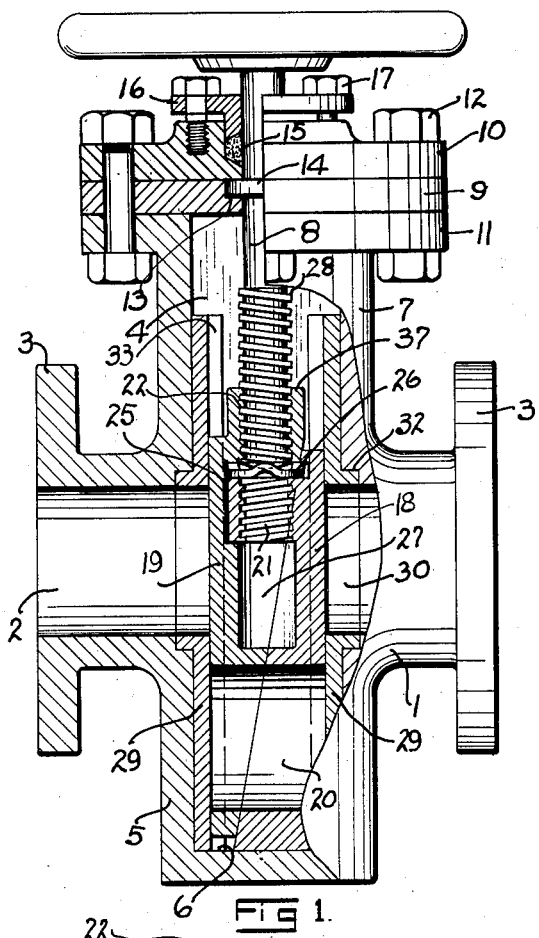

My improved valve includes a valve body 1, having a longitudinal passage 2 therethrough for fluid. Said body is adapted to be connected in the fluid-conducting line in any preferred manner and I have illustrated radial flanges 3 at each end thereof through which bolts may be extended to connect the same with cooperating flanges on the pipe section.

The valve body has a central valve chamber 4 transversely of the fluid-passage 2. Said chamber extends on both sides of the passage, the body being extended on one side at 5 to receive the lower end of the valve when it is in closed position. This portion of the housing is closed about the chamber and the inner wall 6 thereof furnishes a stop for the valve when moved to its closed position. On the opposite side of the chamber is the extension 7, which forms the usual bonnet for the valve. Through this bonnet the valve stem 8 is extended, the outer end of said bonnet being closed by a plate 9 and a cap plate 10. The bonnet has a radial flange 11 and bolts 12 are extended through the flange 11, the plate 9 and the cap plate 10, whereby the assembly is tightly clamped together. There is a recess 13 on the upper side of the plate 9 to receive a radial flange 14 on the valve stem 8. The plate 10 fits closely about the valve stem and extends over the upper surface of the flange 14 whereby the valve stem is held against longitudinal movement but rotatable through the outer end of the bonnet.

A stuffing box includes packing 15 fitting within a recess in the cap plate 10 and around the valve stem, and a gland 16, which is adapted to be forced downwardly upon the packing by cap screws 17.

Figure 3:
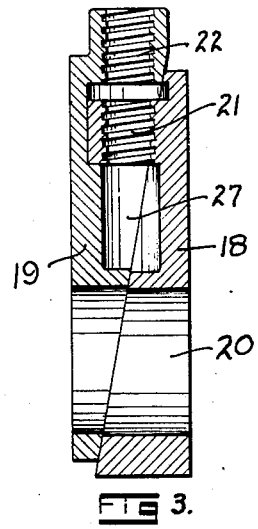
Fig. 3 is a longitudinal section centrally of the two parts of the valve member.
Figure 2:
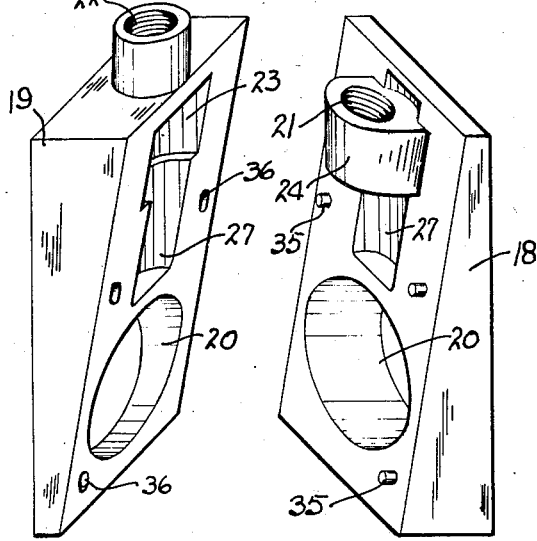
Fig. 2 is a perspective view showing the two parts of the valve separated so as to disclose the interior construction thereof.

The valve member is made up of two mating sections 18 and 19. As will be seen from Figs. 2 and 3, these sections of the valve have their contacting faces cut on an inclined plane whereby there is a wedging action between the two parts of the valve. When assembled together the valve is an approximately rectangular valve member which forms a gate controlling the opening through the valve housing. Each of the sections has a transverse opening 20 therethrough which when brought into alignment with the opening 2 through the housing furnishes a passage for the fluid and it will be noted that when the valve is in open position there is no opportunity for the fluid or sediment conveyed therein to pass into the housing of the valve.

In order that these two sections of the valve may be moved to and from position closing the passage I have formed a threaded socket 21 upon one section and another threaded section 22 upon the mating section. The section 19 is recessed adjacent the upper end, as shown at 23, to provide space within which the boss 24 enclosing the socket 21 may fit, and, as will be seen from Fig. 1, the boss 24 is engaged within the recess 23. There is a space shown at 25 allowing longitudinal movement of the boss in the recess to a limited extent. I prefer to place a spring washer 26 within said recess 25 and upon the upper surface of the box 24 and between the same and the upper wall of the socket 23.

This spring washer 26 tends to hold the section 18 toward the inner end of the socket 23. Both portions of the valve are recessed below the socket 23, as shown at 27 in Fig. 1, to provide space into which the valve stem 8 may extend in the operation of the valve.

The valve stem 8 is threaded with a coarse thread, as shown at 28, to engage within the sockets 21 and 22 of the valve sections, and it will be seen that when the valve is in its lowermost or closed position the valve stem will be screwed entirely free of the socket 21 on the section 18.

Figure 4:
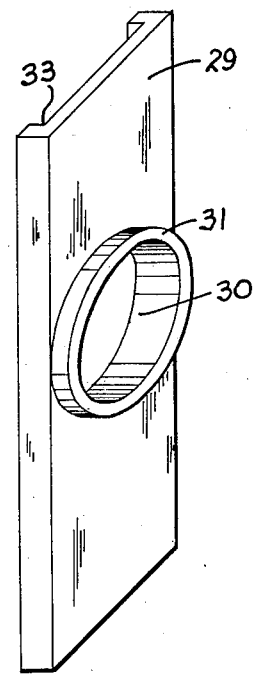
Fig. 4 is a perspective view illustrating a construction of the seat plates.

The valve is movable between two seat plates 29, one at each side of the chamber 4. These plates are constructed as shown in Fig. 4. Their outer faces are formed with an opening 30 adapted to register with the passage 2 and said outer face has a circular flange 31 which fits within a recess 32 formed in the valve body about the passage 2 therethrough. The inner side of the plate is channeled out to provide a trackway 33 within which the valve member may move. The lower ends of the seat plates abut against the inner wall 6 of the housing and the upper ends extend above the midway point of the bonnet. They thus provide a close fit with the valve so that when the valve is wedged in open or closed position a tight contact between the valve and the seat plates is obtained.

Although the relative movement of the two sections constituting the valve member is limited by the engagement of the boss 24 in the recess 23 of the opposing section, I contemplate further limiting the movement between the two parts by forming on the section 18 a plurality of dowels or studs 35. Said dowels engage within elongated recesses 36 in the opposing section. Thus it will be seen that when either section is moved relative to the other the studs will soon engage in the ends of the slots and the two sections of the valve will be compelled to move together.

In the operation of this valve, when the parts are moved to closed position, as shown in Fig. 1, the parts will be moved downwardly by the rotating of the valve stem and when the lower end of the section 18 contacts with the bottom wall 6 of the housing it will be prevented from further downward movement. The continued rotation of the stem will not affect the section 18 as the valve stem has been screwed loose from the socket 21 and the adjacent section 19 will be wedged downwardly so as to tightly force the outer faces of the valve into the seat. Thus there will be a close seal preventing passage of fluid through the housing.

When the valve is to be moved to open position rotation of the valve stem in the opposite direction will first exert a pull upon the section 19 and will start it into open position so as to release the wedging contact between the two sections and, when the dowels 35 contact with the ends of the recesses 36 the two parts will be moved together and the valve stem will be screwed relatively downward into the socket 21 in the sections 18 so as to positively move both sections together until the passage 20 through the valve registers fully with the passage 2 through the housing.

When this position is reached the upper end of the socket 22 indicated at 37 will contact with the lower wall of the plate 9 and the section 19 will thus be brought to a stop. At this point the threaded section 28 of stem 3 will be screwed entirely through the socket 22 and will exert an upward pull upon the section 18. This will cause the section 18 to move upward relative to the section 19, again wedging the sections into sealing engagement with the seat plates and compressing the spring washer 26.

When the valve is to be again started on its closing movement the rotary movement imparted to the valve stem will tend to move section 18 of the valve downwardly and the compression of the washer 26 will hold the section 19 slightly behind the other sufficiently to release the valve before the sliding movement of the two sections together begins and the stem screws into the socket 21. Thus there will be a releasing movement before the full movement of the two sections together is started. Obviously when the stem engages in both sockets the sections move together simultaneously.

It will be noted that when the valve is to be released from its open or closed position for movement there will be a movement of one section ahead of the other so that the wedging action by the two sections will be released before the valve as a whole is moved. This is a feature of advantage. I obtain a tight seal by wedging the two parts together and still find no difficulty in moving the valve due to the fact that the valve releases first before it is moved in its channel in the seat plates. When the valve is in closed position the stem is entirely out of engagement with the socket 21 on the opposing section; and when the valve is open the socket 21 only is engaged with the stem. This enables a tight wedging effect to be obtained. I have provided, therefore, an effective valve which may be easily moved when desired and when in operative position will form a tight seal with the wall of the seat plates.

What is claimed as new is:

1. A valve housing having a transverse fluid passage, a valve chamber formed transversely of said passage, a valve member in said chamber, said valve being of approximately rectangular shape and divided longitudinally on an inclined plane into two sections, said sections being separately movable and having openings adapted to be registered into and out of alignment with said passage, a valve stem threaded to engage said sections, a threaded socket on each of said sections to engage said stem, said stem being movable into and out of one of said sockets, whereby one section may be moved before the other in releasing said sections from closed position.

2. A valve housing having a transverse fluid passage, a valve chamber formed transversely of said passage, a valve member in said chamber, said valve being divided longitudinally on an inclined plane into two sections, said sections being separately movable and having openings adapted to be registered into and out of alignment with said passage, a valve stem threaded to engage said sections, a threaded socket on each of said sections to engage said stem and means to limit the relative longitudinal movement of said sections, said stem being movable into and out of one of said sockets, whereby one section may be moved before the other in releasing said sections from closed position.

3. A valve housing having a through passage, a valve in said housing divided on an inclined plane into two wedge sections, fluid openings through said sections to be moved into or out of registering position with said passage, a threaded socket on each of said sections, a valve stem threaded to engage first one and then the other of said sockets, said sections being relatively movable and means to limit such movement.

4. A valve housing having a through passage, a valve in said housing divided on an inclined plane into two wedge sections, fluid openings through said sections to be moved into or out of registering position with said passage, a threaded socket on each of said sections, a valve stem threaded to engage both said sockets but adapted as the valve approaches the end of either opening or closing movement to screw out of one, but not both, of said sockets, said sections being relatively movable, means to limit such movement, one of the ends of each of said sections being adapted for contacting with a wall of said housing to stop the movement of one section before the other when the valve reaches the end of its movement to open or closed position.

5. A valve housing having a through passage, a valve in said housing divided on an inclined plane into two wedge sections, fluid openings through said sections to be moved into or out of registering position with said passage, a threaded socket on each of said sections, a valve stem threaded to engage both said sockets, said sections being relatively movable, dowels on one section engaging in elongated openings in the adjacent section to cause said sections to be moved simultaneously except for a limited relative movement.

6. A valve housing having a fluid passage, a valve chamber, a valve member having a transverse opening adapted to be moved to and from registration with said passage, said valve being divided on an inclined plane into two wedge shaped sections, a recess in the inner face of one of said sections, a boss having a threaded socket therein on the mating section projecting within said recess, a threaded socket on said recessed section aligned with said first named socket, a valve stem threaded to engage said sockets to move said section, one section being movable relative to the other when said valve is initiating both opening and closing movements.

7. A valve housing having a fluid passage, a valve chamber, a valve member having a transverse opening adapted to be moved to and from registration with said passage, said valve being divided on an inclined plane into two wedge shaped sections, a recess in the inner face of one of said sections, a boss having a threaded socket therein on the mating section projecting within said recess, a threaded socket on said recessed section aligned with said first named socket, a valve stem threaded to engage said sockets to move said sections, said boss having a limited longitudinal movement in said socket, resilient means in said socket to urge said boss against the lower wall of said recess, said resilient means being under compression when said valve is fully open and said sections wedged together.

8. A valve housing having a fluid passage, a valve chamber, a valve member having a transverse opening adapted to be moved to and from registration with said passage, said valve being divided on an inclined plane into two wedge shaped sections, a recess in the inner face of one of said sections, a boss having a threaded socket therein on the mating section projecting within said recess, a threaded socket on said recessed section aligned with said first named socket, a valve stem threaded to engage said sockets to move said section, one section being movable slightly in advance of the other when said valve is initiating its movement to open or closed position, and means tending to resiliently hold one section downwardly relative to the opposing section.

9. A valve housing having a fluid passage, a valve chamber, a valve member having a transverse opening adapted to be moved to and from registration with said passage, said valve being divided on an inclined plane into two wedge-shaped sections, a boss on one section fitting within a recess in the other section, aligned sockets on said boss and said other section, a valve stem adapted for threaded engagement in one of said sockets and to be screwed into and out of the other of said sockets and a loose connection between said sections whereby a limited relative movement of said sections is allowed, the walls of said housing acting to limit the movement of said valve.

10. A valve housing having a fluid passage, a valve chamber, a valve member having a transverse opening adapted to be moved to and from registration with said passage, said valve being divided on an inclined plane into two wedge-shaped sections, aligned threaded sockets on said sections, a valve stem adapted for threaded connection in said sockets and to be screwed out of one of said sockets when said valve is in closed position, and to be screwed out of the other socket when said valve is open, and a loose connection between said sections, whereby one section may be wedged against the other in open or closed position.

SAM SORENSEN.